United States Patent [19]
Wisniewski et al.

[11] Patent Number: 5,591,796
[45] Date of Patent: Jan. 7, 1997

[54] PUMPABLE ANTI-ABRASION INK ADDITIVES AND PRINTING INKS CONTAINING SUCH ADDITIVES

[75] Inventors: Ted Wisniewski, Edison; Bruce Tavares, Blairstown, both of N.J.

[73] Assignee: Rheox, Inc., Highstown, N.J.

[21] Appl. No.: 537,646

[22] Filed: Oct. 2, 1995

[51] Int. Cl.⁶ .......................... C08K 5/01; C08F 114/26; C09D 11/10
[52] U.S. Cl. .......................... 524/484; 524/462; 523/160; 523/161; 523/164
[58] Field of Search .......................... 524/484; 523/160, 523/161, 164

[56] References Cited

U.S. PATENT DOCUMENTS

| | | | |
|---|---|---|---|
| 4,036,718 | 7/1987 | Brown et al. | 204/159 |
| 4,343,863 | 8/1982 | Lawrence et al. | 106/270 |
| 4,396,514 | 8/1983 | Randisi | 252/30 |
| 5,037,566 | 8/1991 | Randisi | 252/28 |
| 5,158,606 | 10/1992 | Carlick et al. | 523/161 |

*Primary Examiner*—Paul R. Michl
*Assistant Examiner*—Olga Asinovsky
*Attorney, Agent, or Firm*—Michael J. Cronin

[57] ABSTRACT

An improved pumpable anti-abrasion/slip ink additive is disclosed comprising a mixture of polytetrafluoroethylene and polyalphaolefin. As an alternative, additional material, such as phenolic resins and oils can be added to the mixture. The additives permit the less costly manufacture of printing inks, most particularly heat set inks and results in print which has improved rub, slip and anti-mar characteristics.

23 Claims, No Drawings

1

PUMPABLE ANTI-ABRASION INK ADDITIVES AND PRINTING INKS CONTAINING SUCH ADDITIVES

BACKGROUND OF THE INVENTION

1. Brief Description of the Invention

This invention relates to anti-abrasion additives for ink formulations, also sometimes called anti-rub, slip and mar resistant ink additives. Such additives are chemicals mixed or dispersed into printing ink formulations in order to impart to such inks resistant strength and anti rub properties after printing has occurred. Ink print on paper and other materials will then resist abrasion and deterioration of the ink while maintaining slip properties, defined below, when the ink is subjected to a wide variety of smear, smudge and mar forces, including frictional forces such as packing, shipping and handling.

2. Description of the Prior Art

It is desirable for printing ink to have strength properties, so that after printing on paper or another substrate, the ink does not ruboff when the surface is subjected to abrasive forces. Inks, specifically heat-set inks, have long been formulated with special additives, designed to provide these properties, which are added by the ink manufacturer. The printing ink, as modified, will possess as well improved mar resistance. Marring of ink detracts from the perfection of readability of the word message the print is intend to convey. The ink, after addition of these special additives, also will have improved slip properties. Slip properties permit, for example, other printed pages to glide easily over the ink without causing it to wear or smudge.

Anti-abrasion additives can be added into ink formulations during manufacture by being mixed, or less preferably ground, into the formulation with the ink colors or pigments, or added as a part of the final ink blend. Such additives can also be dispersed into the precursor ink solvents or resins.

Many anti-abrasion ink additives in commercial use today are in hard wax-like solid or powder form. Anti-rub additives are generally prepared and have been often used as such in this physical form. Harder waxes have proved difficult to mix satisfactorily or disperse into ink systems as additives. The dispersion of these hard wax products into magazine inks and other similar resin-based systems is particularly burdensome. It is often required to melt the wax additive by electric or other type of heating as part of making the final printing ink. The anti-abrasion or rub qualities imparted by commercial waxes can be highly influenced by the melting temperature of a particular wax. Such waxes added to inks often result in only a small reduction in rub-off, not its complete elimination. With the heat and movement imparted by the friction of constant rubbing, particles of the ink film often continue to spread to unprinted areas. In view of these difficulties, anti-abrasion ink additives have been disfavored, and have not reached their full market potential.

The introduction of anti-abrasion hard waxes into inks in order to solve the rub-off problem, however, has introduced other problems. Often, the more wax additive that is added to improve rub resistance, the more significant the decrease in desirable gloss of the printed ink from the gloss, as printed, to a lower level, which is particularly unsatisfactory for quality magazines or prints. It is very important to a publisher to minimize this reduction in gloss of a printed ink because of abrasion forcer. Accordingly, in most applications a compromise has to be achieved between the desired level of anti-rub properties and the amount of gloss reduction.

In addition, since such anti-abrasion waxes are either solids or in powder form, they are often difficult to disperse into inks, which are essentially liquid systems. Ink manufacturers have long searched for a pumpable liquid (including near-liquid or paste-like) anti-abrasion additive, for ease of ink manufacture alone. Problems associated with the use of harder waxy additives include poor dispersibility when added to inks, and undesirably long dissolution times. An additive which requires heating, as do most hard wax anti-abrasion additive products, also presents additional manufacturing costs and problems which ink manufacturers would prefer to avoid. Finally, there is the factor of increased cost associated with an ink containing relatively expensive waxes. In the case of newspaper and certain magazine news inks, cost is an important factor and, therefore, at the present time most news inks do not ordinarily utilize anti-abrasion additives, and inexpensive magazine inks use only limited varieties and in small amounts.

Synthetic waxes such as polyethylene waxes are some types of anti-abrasion waxes used in the ink industry as anti-rub additives. Such hard waxes are often added by the ink manufacturer in the form of dispersions of the wax in resins of the same particular type characteristic of the ink formulations into which they are to be incorporated. Hard waxes prepared with polytetrafluoroethylene are known and used in a variety of printing inks in the same manner, but are especially targeted for heatset inks, where the temperature of the drying apparatus does not cause them to significantly soften or melt. Polytetrafluoroethylene-based powder waxes are also added directly to in-process inks using high shear forces imparted by fairly complicated equipment.

The incorporation of many commercial anti-abrasion waxes presents similar conventional handling problems as are encountered with the dispersion of other types of solid or nearly-solid materials. When added to ink systems, these types of waxes tend to agglomerate into clumps. When dispersed directly, there has been an "uneven wetting out" of the product resulting in the formation of lumps or globules whose core is still the dry wax. Agglomeration can be reduced in many cases by adding the wax to the system slowly, with agitation. However, such slow dissolution can affect the efficiency of specific ink manufacturing operations.

Non-pourable waxes have also proved particularly difficult to incorporate in industrial ink-making processes because they often require long periods of time to dissolve. Both in simple ink resin solutions and, more particularly, in ink formulations comprising other chemicals and ingredients, extended agitation and aging periods are necessary before proper viscosity and dispersion can be attained.

For the above reasons, as stated, ink manufacturers have searched for a simple, fast and effective way of mixing anti-abrasion additives into ink systems. Because of this search, some commercial products are used by ink manufacturers as pourable liquid "concentrates". Such additives, in liquid form for inks and other compositions, usually involve taking the wax sold by a anti-abrasion wax manufacturing company and preparing, at the ink manufacturing operation by the ink manufacturer, a pre-mix liquid mixture or blend of the anti-abrasion wax and the ink vehicle being used to incorporate into the ink formulation.

Commercial anti-rub wax additives available in the marketplace include Protech 120, sold by Carroll Scientific, Inc. which is described as an 83% active compound containing some form of DuPont virgin Teflon® and a synthetic wax blend, with a petroleum distillate vehicle. Lawter International sells an anti-rub hard wax ink additive product, designated Lawter SA- 1021, which comprises a phenolic resin, some type of polytetrafluoroethylene, and a petroleum oil. It is also believed that commercial anti-rub wax additives containing polytetrafluoroethylene may have been sold in the past which may have also contained small amounts of some type of polyalphaolefins.

A number of prior art patents describe anti-abrasion additives for ink formulations and the use of polytetrafluoroethylene.

In non-ink applications, U.S. Pat. No. 5,159,019 describes the use of polytetrafluoroethylene in a resin mixture to provide abrasion resistance to plastic materials which are injection molded. U.S. Pat. No. 4,096,207 shows the use of polytetrafluoroethylene to improve the abrasion resistance of elastomers which are in dynamic contact with metals.

U.S. Pat. No. 5,024,700 describes the use of triethanolamine as an ink additive, which among other properties, is described as providing improved rub resistance to oil and resin-based ink compositions, and as particularly useful for newspaper printing applications in this regard.

In the ink area, U.S. Pat. No. 3,843,570 describes a porous material comprising polytetrafluoroethylene obtained by polymerizing a monomer capable of forming a resin and discloses that the material is suitable with inks. U.S. Pat. No. 5,158,606 describes a printing ink composition with a high degree of rub-off resistance comprising a) a dispersion of a pigment in a vehicle containing an oil and b) polymer latex emulsified in said dispersion. The patent further discloses that where cost is not of paramount concern, a polytetrafluoroethylene wax can be added to the ink composition. Typically the polytetrafluoroethylene wax discussed comprises about 40 to 60 weight percent of polytetrafluoroethylene in a petrolatum base. Petrolatums are mineral oils or mineral jellies.

OBJECT OF THE INVENTION

Along with the obvious advantages and cost savings that can be realized in shipping a 100% active pumpable anti-abrasion additive, such a product can have the added advantage of being largely free of resins and solvents. A pumpable, "super-dispersible" anti-rub additive which can be added directly to ink formulations would fill an important market need.

It is a still further object of this invention to provide an improved anti-rub ink additive with improved mar resistance and anti-rub properties as compared to existing additives.

Accordingly, it is a further object of the present invention to solve or substantially alleviate the problems created by most present day hard wax-like ink anti-abrasion additives. It is, therefore, a more specific object of the present invention to provide a slip, anti-rub and anti-mar ink additive (defined as an anti-abrasion additive) which is useful for increasing the performance properties of inks in an improved efficient manner. The additive maintains good gloss degradation properties in the ink formulations in which it is used.

DETAILED DESCRIPTION OF THE INVENTION

In one embodiment, the pumpable anti-abrasion additive composition for ink formulations of this invention is a mixture comprising:

a) 40 to 70 parts by weight of polytetrafluoroethylene and
b) 30 to 60 parts by weight of one or more liquid polyalphaolefins.

The combination of polytetrafluoroethylene with liquid polyalphaolefin in the above defined proportion leads to a unique additive having synegistic properties which imparts good slip, abrasion resistance, low misting and mar resistance without the usual loss in gloss when dispersed into ink.

The parts by weight are relative of one of the above two ingredients to the other. The mixture may contain additional ingredients including resins and oils. It is most preferred that an anti-abrasion additive composition containing additional ingredients have, by weight of the entire composition, 40% or more of the two specific materials described above.

Polytetrafluoroethylene (PTFE) is a polymer of tetrafluoroethylene. The substance is most often essentially a straight very long molecular chain of the repeating unit $[-CF_2-CF_2-]_n$. As formed it has a milk-white color, and can be molded by powder metallurgy techniques, involving mixing with a diluent that is subsequently removed. PTFE can be produced as a white thermoplastic powder having a melting point of about 621° F. This material is characterized by high service temperature, chemical inertness, excellent electrical properties and a low coefficient of friction.

PTFE is highly resistant to oxidation and action of chemicals including strong acids, alkalines, and oxidizing agents, and is resistant to nuclear radiation and UV rays, ozone, and weathering. PTFE products retain useful unchanged properties up to 350°–450° C., and are essentially non flammable at these temperatures. PTFE has been used in gaskets, seals, flexible hose, coatings for rockets and space vehicles, chemical process equipment, coatings for coaxial coils, spacers, insulators, wire coatings and tape in electrical and electronic fields, bearings, seals, piston rings, felts, packings and bearings.

PTFE was originally invented by scientists employed by E.I. DuPont de Nemours and Company, Inc. (DuPont) and is today still sold by DuPont under the trademark Teflon®. DuPont provides the product in various virgin and reprocessed grades, and in various particle sizes and grinds, which can be used in this invention.

Tetrahalo-substituted ethylenes, most specifically PTFE, are utilized as starting materials in the preparation of homopolymeric substances and of copolymers. PTFE finds a wide variety of uses in commercial applications in addition to those discussed above. For example, the polymer is most well known as a thin coating for cooking utensils such as frying parts or pots, whereby the problem of food and burnt remnants of food adhering to the surface of the cooking utensil is eliminated. The various forms of the polymeric material, in addition to its use as a coating for cooking utensils where stickiness must be avoided, and the uses reported above, may also be used as components for electrical insulation, linings for drums and containers, valve seats, laminates, diaphragms, and molded parts of pumps and fittings, tubes or hoses. The various uses of polytetrafluoroethylene stem from the physical properties of the polymer, such as its being nonflammable, as well as being highly resistant to oxidation and to the action of chemicals including strong acids, alkalis, and oxidizers.

PTFE as sold is normally insoluble in water, and can often be purchased in a powder form most preferred as useful for this invention. PTFE particularly useful for this invention can be obtained as either a commercial catalog product or as special order product from a variety of companies, including DuPont, Royce Company, Imperial Chemicals International, Ltd. (ICI), Hoescht (Germany), Cray Valley, Ltd., North American Fluorpolymer, Shamrock/MP Company, Ausimont, Daikin, and PTK International Limited along with numerous others.

Preferred forms of PTFE useful for the instant invention include high molecular weight types (as high as 40 million), which are pre-ground products of a powder-form, with usually some degree of irradiation. Polytetrafluoroethylene is often industrially produced by the polymerization of tetrafluoroethylene monomers dispersed in an aqueous phase either in the form of emulsion or suspension in the presence of an emulsifying or a dispersing agent, using free radical-generators as catalysts. It is known that said process can be carried out by initiating the polymerization with ionizing radiation instead of using free radical-generators in the presence of either emulsifying or dispersing agents.

Certain powders supplied by the PTFE manufacturers tend to agglomerate, and must, for use in this invention, usually be sintered during fabrication. Sintering involves the agglomeration of PTFE at temperatures slightly below or slightly above its melting point. Sintering increases PTFE density and strength. While heat and pressure are essential for sintering, decrease in surface area is a more important factor to achieve desired results. For example, some types of polytetrafluoroethylene powder are preformed under pressure into a desired shape, and sintered at atmospheric pressure in an oven at a temperature in the range of from about 700° F. to about 750° F. Other types of powders are preformed under pressure and sintered under pressure, normally at a temperature in the range of from about 600° F. to about 750° F. According to U.S. Pat. No. 3.766,031, as of the date of the patent, none of these sintered materials could readily be processed into fine particles. For example, a sintered polytetrafluoroethylene is described in the patent which can only be reduced by high impact pulverization to the size range of from 100 to 200 mesh (149 to 74 microns), and this can be accomplished only with the associated use of coolants, such as liquid carbon dioxide or liquid nitrogen.

Irradiation of sintered PTFE is normally required to facilitate micronization of PTFE into a useable powder form for the use of this invention; however, irradiation of unsintered PTFE can also produce PTFE of the average particle size discussed below—see U.S. Pat. No. 4,036,718, which shows small micron size unsintered PTFE. It is also believed that non-irradiation proprietary processes are today employed by some suppliers which produce commercially available small particle size PTFE useful for this invention.

The resultant PTFE powder is often referred to as "granular," since it is of a small particle size, and has a grainy texture in that the particles are not smooth and even-shaped. In the present invention, irradiated sintered PTFE is preferred.

The term "irradiation" when used with PTFE is defined as exposure to wavelengths shorter than those of visible light, and includes treatment with alpha-rays, beta-rays, gamma-rays, X-rays, electron beams, ultra-violet (UV) rays, neutron beams, proton beams, and the like. Particularly preferred for this invention are virgin irradiated sintered grades and similar reprocessed grades; specific useful irradiated PTFE types include virgin granular products.

Micronization of the PTFE to a particle size of about 2 to 10 microns is preferred, with an average particle size of about 2 to about 5 microns more preferred. A micron is one millionth ($10^{-6}$) of a meter or 10,000 Angstroms. See U.S. Pat. No. 4,036,718, which describes a representative process for producing finely-divided PTFE. Micronization can be accomplished by a variety of other techniques, including milling and grinding. Particle size average for PTFE can be determined by mesh and screen tests, well known in the art, as well as, by use of other more accurate tests when dealing with finely divided PTFE. See, for example, the tests described in U.S. Pat. No. 3,983,200 (air sedimentation rate using Stokes law) and U.S. Pat. No. 4,036,718 (optical testing).

Both off-specification and recycled or reprocessed PTFE, as well as virgin PTFE, can be utilized to make products useful in this invention. Mixtures of various types of PTFE are also useful. A most preferred PTFE useful for this invention would be an irradiated, sintered, granular-type product which had been micronized to about a 2.5 micron average particle size. PTFE of this type is commercially available from many of the suppliers mentioned above.

The second critical element for producing the additives of this invention is polyalphaolefin. Polyalphaolefins are chemicals based on olefins; olefins being a class of unsaturated aliphatic hydrocarbons having one or more double bonds, usually obtained by cracking naphtha or other petroleum fractions at high temperatures (1500°–1700° F.). Those olefins containing one double bond are called alkenes, and those with two, alkadienes or diolefins. Alpha olefins or α-olefins are particularly reactive, because the double bond is on the first carbon atom. The more common use of polyalphaolefins are as industrial oils, hydraulic fluids, and heat transfer fluids.

As described, polyalphaolefins (PAO) are polymers derived from simple alpha olefins. Most commercial polyalphaolefins are formed by polymerization of alpha olefins, such as isobutene, in the presence of suitable metal halide catalysts. Such starting alpha olefins contain 3 or more carbon atoms where the double bond is on a terminal carbon atom. There is usually no more than one alkyl substitute on the carbon atom once the double bond is removed from the terminal carbon atom. Such olefins can have the formula:

$$R\text{---}CH=CH_2,$$

where R is an alkyl group. The production of polymers of alpha-olefins by the use of aluminum halide catalysts and by high pressure thermal or peroxide-catalyzed polymerization is well known in the prior art.

Liquid polyalphaolefins are preferred for this invention. Liquids characteristically have the ability to flow and to fill a container into which they are put, a property depending largely on their viscosity. Molecules of liquids are free to move within the limits set by intermolecular attractive forces but still are constrained by greater forces than a gas. Liquids can also be characterized as substances which, at their surface, eject some small portion of their molecules at a rate depending on their surface tension. Particularly useful for the invention hereof are the liquid forms of PAO of a molecular weight of around 275 to 5000, with a preferred range of around 1000 to 3500. Alpha olefins containing carbon chains of $C_3$ to $C_{25}$, such as propene, butene, sentene, hexene, octene, nonene, dicene etc. can be polymerized to produce polyalphaolefin products useful for this invention. If the PAO product is greater than about $C_{40}$, the viscosity of the resultant product is generally too high to have commercial utility. Particularly preferred are $C_5$ to $C_{20}$ polymerized alpha alkenes, which can be produced from hydrogenated natural and synthetic hydrocarbon bases, and are most often produced in a clear liquid form. Particularly useful in formulating the instant invention are polyalphaolefins made by several companies including Chevron and Petrolite Corporation, with Petrolite Vybar 825, which is a $C_{10}$ polyalpha olefin, an examplary material. A line of polyalphaolefins made by Albemarle Corporation and sold under the trade description Durasyn including Durasyn 162, 164, 166, 168, 170, 174 and 180 are also useful. Particularly preferred are polyalphaolefins, made from a synthetic hydrocarbon base, having a molecular weight of about 900 to 1400 and a viscosity at 40° C. of around 300 to 500 cps, measured by ASTM test method D445.

A preferred embodiment of the instant invention contains about 50% of each of the two mentioned chemicals, with no additional additives other than PTFE and PAO. Additional chemicals which can be optionally added to form another inventive composition include narrow cut petroleum oils, petrolatums and soluble hydrocarbon or phenolic resins.

An inventive composition containing chemicals in addition to the two above-mentioned basic ingredients has also proved useful. Such composition contains about 30–60% PTFE, about 25–45% PAO, about 5–15% of a petroleum oil and about 5–15% of a hydrocarbon or phenolic resin. Percentages are in parts by weight taking into account all four ingredients in the final composition. A preferred type of petroleum oil are Magie Oils, printing ink oil solvents which are narrow-cut oils made and sold by Magie Brothers Inc., a Division of Pennzoil. The commercial products designated Magie Oil 47 and 470 are particularly preferred. Also useful are oils designated Amprint 231 from Total Petroleum and a similar line of oil products sold by Exxon Corp.

Hydrocarbon resins supplied by Neville Chemical Company, Pittsburgh, Pa., designated Nevchem 110 and Nevchem 140, are representative of a much larger variety of hydrocarbon resins useful in this invention. Also useful are resins sold by Arizona Chemical, Panama City, Fla. under the Betabrene and Betalite trademarks including Betabrene 255, and Resinall Corporation, N.C. particularly Resinall trademark products designated Resinall 737, 747, 771 and 784. Phenolic resins are sold by Arizona Chemical under the Beckacite trademark including Beckatite 112, 115, 6004 and 6006.

The composition of this invention can be prepared with a wide variety of industrial mixing apparatus, including media mills, pug mills and paddle mixers. Other types of similarly useful apparatus are well known in the art. The starting chemicals can be added together in any order with the addition of PAO being added first and then the PTFE added as a preferred method. The mixture is then mixed, sheared or stirred for a period of time necessary to achieve satisfactory dispersion, which can be in some cases are no longer than a few minutes up to several hours. In many embodiments, the resultant mixture product will have the consistency of smooth light cream; often the mixture will have a creamy-white color as well, and will be non-gritty to the touch.

While "pourable" and "pumpable" are terms resisting precise definitions, they are given a working definition in this application as follows:

(a) "pourable" in general means that the product exhibits 15,000 cps viscosity or less at 77° F., as measured with a Brookfield RVT Micometer@50 rpm employing a #4 spindle. Examples of products that are pourable include honey, molasses, and dishwasher liquids.

(b) "Pumpable" products exhibit 15,000 cps or less in viscosity at the shear rate of the pump. Pumpable products would include pourable products. Pumpable substances could be non-pourable (up to 75,000 cps) under static condition, but drop to 15,000 cps or less under shearing, because of their shear thinning response. Examples of pumpable products would include: construction pastes and grouts, mayonaisse-type substances, and soft shoe polishes.

Inks embodying the inventive compositions can be prepared utilizing machinery presently used to prepare existing ink formulations. While the relative amounts may vary, in general, the anti-abrasion composition will preferably make up from 0.1 to 10% by weight of the ink to be treated. Typically, more preferred use levels are 0.25% to 7% of the mixture composition to the ink system, the percent being based on the ink system to be affected. All types of inks can benefit from the inventive additive with heat set high quality inks most benefited.

Use of the composition of the invention is somewhat similar to the use of present, commercial, additives, and should in general require no special arrangements or apparatus when incorporating such compositions into ink systems. The anti-abrasion composition can be easily mixed into the ink system using conventional mixing equipment, such as medium and high-speed dispersing apparatus, and similar such mixture apparatus. Substantially less time and shear effort will be necessary to obtain effective dispersion of the inventive additives compared to many present-day commercial products. The additives are particularly useful in quality inks used for magazine covers and color advertising inserts commonly contained in magazines such as the National Geographic and Cosmopolitan.

The product of this invention, being pumpable, can easily be dispersed in most ink liquids. The product can be added directly to a ink master batch by using an appropriate mixer.

Printing ink compositions using the present invention may be prepared by conventional techniques, e.g. by preparing a dispersion of the pigment in the ink vehicle and adding the additive. One preferable procedure for preparing ink compositions of the present invention is as follows:

a) Disperse the ink pigment in a vehicle, forming an ink formulation, and then b) disperse the inventive additive into the ink formulation by pouring, and then mixing the ink formulation for a brief period of time.

A preferred offset heatset printing ink composition may be made as follows:

a) Prepare a dispersion of 5–30 wt. percent ink pigment in 70–90 wt. percent of an ink vehicle: and b) add at a 2–5 wt. percent loading, based on the weight of the ink composition, the inventive polytetrafluoroethylene/polyalphaolefin additive, incorporating it in the above dispersion, said additive comprising 40–60 wt. percent polytetrafluoroethylene, with the remainder polyalphaolefin.

The inventive anti-abrasion/slip compositions provide substantially improved anti-abrasion properties, including better mar and slip, to a wide variety of printing inks compared to present additives. Since the additives are pumpable, elaborate heating and mixing apparatus is often not required, and the additives are as a result cheaper to use. The use of polyalphaolefin also decreases the cost of the additive, and allows diminished use of polytetrafluoroethylene in certain inks, which properties can result in a lower cost product. The inventive additives do not cause misting as do other commercial additives. More importantly, inks using the inventive additives maintain gloss after abrasion testing which is unique and superior to prior art products.

The following examples are illustrations designed to assist those skilled in the ink formulation and additive art to practice the present invention, but are not intended to limit the wide scope of the invention. Various modifications and changes can be made without departing from the essence and spirit of the invention. The various chemicals used in the examples are commercial materials, except for the inventive compositions.

EXAMPLES

Example 1

A number of ink formulations were prepared using compositions of the invention hereof. Composition A was a mixture of 50% granular PTFE of an average particle size of about 5 microns (which had been irradiated) and 50% Durasyn 174 polyalphaolefin. Composition B was a mixture of 50% of the same PTFE. 30% of Durasyn 174, 10% Magie Oil 47 and 10% Nevchem 110 Resin. Test results of a commercial wax anti-abrasion additive containing PTFE in dispersion available from Lawter International, designated Lawter Standard by Sun Printing Ink Company, was used for comparison. The basic ink formulation used before additive addition was a zero grind, heat set ink obtained from Sun Chemical.

The additives were dispersed in the basic ink formulation using a Cowles mill at 2000 RPM for 15 minutes. The ink was then printed on cover stock, dried using a Sinvater drier and "rubbed" using a Sutherland rub test. The Sutherland test involved 100 strokes with a 4 pound weight covered with a paper substrate using a mechanical device known as a Sutherland rub tester. Gloss was measured using a gloss meter. The loading of additive used was 7% by weight. The results are reported in Table I. The densities using a McBeth densitometer were taken before the ink films were evaluated.

The gloss degradation determinations were rated as follows:

TABLE I

| Sample | Gloss -Amount of Loss- Degradation (before & after) | Density |
|---|---|---|
| Lawter standard | 4 | 183 |
| Composition A | 2 | 183 |
| Composition B | 1 | 183 |

Discussion of Results: The results above show significantly less before and after effect on gloss using the inventive additives compared to a commercial standard. These results show that the gloss of the standard degrades more under pressure testing than both the samples made according to the invention.

Example 2

The following tests was run to measure the amount of "rub-off" or deterioration that the ink formulation, with various additives, encountered.

A test for mar/rub resistance was performed. The mar/rub tests is one of the most critical measures of performance in printed ink testing. This testing simulates the printed package, whether it be a magazine cover, cardboard packaging (such as cereal boxes) or can labeling, etc. and carries its existence from manufacturing to shipping/receiving (such as movement inside the truck or carrier rubbing against one another) onto the produce store (which requires handle onto the shelves) and then finally to the consumer who chooses products according to his or hers aesthetics.

The test provides rub off from a clean substrate (paper stock) onto a printed stock normally using a 4 pound weight. The weight was set to provide stroking, which is a back and forth motion, for cover paper stock and provided 100 strokes. For insert paper stock 50 strokes is usually considered sufficient. However, the amount of strokes can change according to customer specifications. Results are shown in Table II.

The results were determine through visual inspection and were compared to the standard. The rub-off result reported were based on visual observation of the amount of printed ink transferred to the printed substrate. The types of resistance were graded as below:

| Rub Mar Resistance | |
|---|---|
| Excellent (nearly no rub-off) | 5 |
| Good | 4 |
| Average | 3 |
| Below Average | 2 |
| Poor | 1 |

TABLE II

| Sample | Rub-Off Resistance |
|---|---|
| Lawter Standard | 3 |
| Composition A | 5 |
| Composition B | 5 |

Discussion of Results: The inventive additives displayed nearly no rub-off and provided excellent results compared to the Lawter standard. The inventive samples in fact had very little or no rub off. The standard had a highly visable rub off.

Example 4

A number of tests were run for slip measurement. This test was to show the ratio of the frictional force resisting movement of the surface being tested to the force applied normal to the surface.

The apparatus used was a metal block sled with a plane lower surface 2–4" block and plane at 45° angle at a ratio of 1.5°±0.5° /S. The weight was attached to a meter or gauge to indicate speed at which the weight slides on the substrate.

Slip resistance carries a great deal of importance for an anti-abrasion additive. Its testing works in conjunction with the anti-rub testing. If the slip is poor, for example, a scientist expects the additive to also have very poor rub resistance. It will also indicate that there is static which can cause problems in printing. If slip resistance is below average, for example, it could cause magazine insert print papers to adhere to each other, which is not desirable, and is unacceptable to a publisher.

Table III shows the inventive additives have excellent slip which compared to a standard product. The test result parameters were graded as follows:

| Slip (Angle°) Resistance | |
|---|---|
| Excellent | 15–17 |
| Good | 18–20 |
| Average | 21–23 |
| Below Average | 24–26 |
| Poor | 27 and above |

Misting tests were also run using state of the art techniques. Misting occurs when the additive in the finished formulation is printed on a press. When this happens, the print cylinder gives off a fine spray which carries onto the other impression cylinders. Most ink manufacturers add a fiberous additive to compensate for this problem. As can be seen from Table III, the inventive additives over-come this problem.

The test results parameters were as follows:

| | Misting |
|---|---|
| Excellent | 0% |
| Average | 1–5% |
| Poor | 6% and above |

TABLE III

| Sample | Slip (Angle°) Resistance | Misting |
|---|---|---|
| Lawter Standard | 22 | <6% |
| Composition A | 15 | 0% |
| Composition B | 18 | 0% |

The foregoing background, description and examples have been set forth merely to illustrate the invention and are not intended to be limiting. Since many modifications and simple changes of the disclosed embodiments incorporating the spirit and substance of the invention may occur to persons skilled in the art, the invention should be construed to include everything within the scope of the appended claims, equivalents thereof and obvious variations thereof.

We claim:

1. A pumpable anti-abrasion additive for ink formulations comprising:
   a) about 40 to 70 parts by weight of powdered sintered polytetrafluoroethylene; and
   b) about 30 to 60 parts by weight of one or more liquid polyalphaolefins.

2. The additive of claim 1 wherein the polytetrafluoroethylene has an average particle size of from about 2 to about 10 microns.

3. The additive of claim 2 wherein the polytetrafluoroethylene has an average particle size of about 2 to about 5 microns.

4. The additive of claim 2 wherein the average particle size resulted from micronization of irradiated sintered polytetrafluoroethylene.

5. The additive of claim 1 wherein the polytetrafluoroethylene had been irradiated.

6. The additive of claim 1 wherein the polytetrafluoroethylene is a virgin granular powder.

7. The additive of claim 1 wherein one or more of the liquid polyalphaolefins has a molecular weight of about 275 to 5000.

8. The additive of claim 7 wherein one or more of the liquid polyalphaolefins has a molecular weight of from about 1000 to 3500.

9. The additive of claim 1 wherein one or more of the liquid polyalphaolefins is a $C_3$ to $C_{25}$ polymerized alpha alkene.

10. The additive of claim 9 wherein one or more of the liquid polyalphaolefins is a $C_5$ to $C_{20}$ polymerized alpha alkene.

11. A pumpable anti-abrasion additive for ink formulations comprising:
   a) about 30 to 60 parts of weight of powdered sintered polytetrafluoroethylene, and
   b) about 25 to 45 parts by weight of one or more liquid polyalphaolefins, and
   c) about 5 to 15 parts by weight of one or more petroleum oils other than polyalphaolefin and;
   d) about 5 to 15 parts by weight of one or more resins other than polyalphaolefin selected from the group consisting of hydrocarbon resins and phenolic resins.

12. The additive of claim 11 wherein the polytetrafluoroethylene is a powder with an average particle size of from about 2 to about 10 microns.

13. The additive of claim 12 wherein the polytetrafluoroethylene is a virgin sintered powder with an average particle size of about 2 to about 5 microns.

14. The additive of claim 12 wherein the average particle size resulted from micronization performed by grinding of irradiated sintered polytetrafluoroethylene.

15. The additive of claim 11 wherein the polytetrafluoroethylene has been irradiated.

16. The additive of claim 11 wherein the polytetrafluoroethylene is a virgin granular powder.

17. The additive of claim 11 wherein one or more of the liquid polyalphaolefins has a molecular weight of about 275 to 5000.

18. The additive of claim 17 wherein one or more of the liquid polyalphaolefins has a molecular weight of from about 1000 to 3500.

19. The additive of claim 11 wherein one or more of the liquid polyalphaolefins is a $C_3$ to $C_{25}$ polymerized alpha alkene.

20. The additive of claim 11 wherein one or more of the liquid polyalphaolefins is a $C_5$ to $C_{20}$ polymerized alpha alkene.

21. A pourable anti-abrasion additive for ink formulations comprising:
   a) about 40 to 70 parts by weight of powdered sintered irradiated polytetrafluoroethylene of an average particle size of about 2 to about 10 microns; and
   b) about 30 to 60 parts by weight of one or more liquid $C_3$ to $C_{25}$ polymerized alpha alkene polyalphaolefins.

22. An ink formulation containing from about 0.1% to 10% by weight of a pumpable anti-abrasion additive comprising:
   a) about 40 to 70 parts by weight of powdered sintered polytetrafluoroethylene; and
   b) about 30 to 60 parts by weight of one or more liquid polyalphaolefins.

23. An ink formulation containing from about 0.1% to 10% by weight of a pumpable anti-abrasion additive comprising:
   a) about 30 to 60 parts of weight of powdered sintered polytetrafluoroethylene, and
   b) about 25 to 45 parts by weight of one or more liquid polyalphaolefins, and
   c) about 5 to 15 parts by weight of one or more petroleum oils other than polyalphaolefin and;
   d) about 5 to 15 parts by weight of one or more resins other than polyalphaolefin selected from the group consisting of hydrocarbon resins and phenolic resins.

* * * * *